United States Patent
Ruigrok et al.

(10) Patent No.: US 6,804,175 B2
(45) Date of Patent: Oct. 12, 2004

(54) THERMALLY ASSISTED MAGNETIC RECORDING MEDIUM HAVING NON-RECORDING AREAS

(75) Inventors: Jacobus Josephus Maria Ruigrok, Eindhoven (NL); Steven Broeils Luitjens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 58 days.

(21) Appl. No.: 10/221,914

(22) PCT Filed: Mar. 27, 2001

(86) PCT No.: PCT/EP01/03494
§ 371 (c)(1),
(2), (4) Date: Sep. 17, 2002

(87) PCT Pub. No.: WO01/73763
PCT Pub. Date: Oct. 4, 2001

(65) Prior Publication Data
US 2003/0128635 A1 Jul. 10, 2003

(30) Foreign Application Priority Data

| Mar. 28, 2000 | (EP) | 00201120 |
| Apr. 15, 2000 | (EP) | 00201357 |
| Apr. 15, 2000 | (EP) | 00201358 |
| Apr. 15, 2000 | (EP) | 00201359 |
| Apr. 15, 2000 | (EP) | 00201360 |

(51) Int. Cl.$^7$ ............................................... G11B 11/00
(52) U.S. Cl. ...................................... 369/13.55; 360/59
(58) Field of Search ............................ 369/13.55, 13.54, 369/13.53, 13.35, 13.39, 275.4; 428/64.3, 64.1, 64.4; 360/59

(56) References Cited

U.S. PATENT DOCUMENTS

| 4,513,407 | A | * | 4/1985 | Bricot | 369/44.39 |
| 4,737,947 | A | * | 4/1988 | Osato et al. | 369/13.35 |
| 4,918,661 | A | * | 4/1990 | Yamauchi | 369/30.36 |
| 4,947,384 | A | * | 8/1990 | Suzuki et al. | 369/275.4 |
| 4,949,330 | A | * | 8/1990 | Pasman et al. | 369/275.4 |
| 5,161,134 | A | * | 11/1992 | Lee | 369/13.32 |
| 5,191,563 | A | * | 3/1993 | Lee et al. | 369/13.35 |

* cited by examiner

Primary Examiner—Tan Dinh
(74) Attorney, Agent, or Firm—Michael E. Belk

(57) ABSTRACT

A storage medium for thermally-assisted magnetic recording has a recording layer which substantially parallel tracks for recording information. The recording layer includes a series of recording regions, each region comprising a plurality of tracks for magnetically recording information. The tracks in a region have a pitch p, and a region extends a distance ½ p beyond a centre line of the outermost track of the region. Neighbouring regions are separated from one another by magnetically non-recording areas having a width substantially equal to or larger than the pitch p. The writing of one region does not have thermal cross-talk on other regions.

14 Claims, 6 Drawing Sheets

THERMALLY ASSISTED MAGNETIC RECORDING MEDIUM HAVING NON-RECORDING AREAS

The invention relates to a storage medium for thermally-assisted magnetic recording including a recording layer having substantially parallel tracks for recording information. The invention also relates to a method for recording information on a storage medium and an apparatus for carrying out the method.

In the near future, both longitudinal magnetic and (magneto) optical recording will be hampered in their growth to higher densities and data rates. In conventional magnetic recording superparamagnetism will finally limit the stable and low-medium-noise recording of information, while in magneto-optical recording the bit size and read data rate are limited by the optical resolution and the limited Kerr rotation and allowable laser power during reading, respectively. It is generally believed that the limits of conventional magnetic disk recording of about 50–100 Gb/in$^2$ will be reached in a few years from now, because the present areal density in the most advanced products is already near 10 Gb/in$^2$ and the present annual growth rate is over 60%.

Limiting areal densities, $D_a$, of 50–100 Gb/in$^2$ (1 Gb/in$^2$=1 Giga bit per square inch=1.6 bit/$\mu$m$^2$) for conventional longitudinal recording were estimated by Bertram et al.[1], based on the calculated SNR of granular media, SNR$_{med}$, with 10-year data life time and recordable with high-saturation write heads. For future improvements in densities a drastic reduction of the grain size is necessary to maintain a sufficient SNR$_{med}$. Particle-size reduction, however, reduces the stability of the stored information strongly, unless the anisotropy field, $H_k$, of the particles is drastically increased. A medium with a high $H_k$ has a higher coercivity field, $H_c$, and it is more difficult or even impossible to record on such media with conventional write heads or even the best write heads presently available with iron or cobalt-rich flux guides.

The areal density may be further increased using hybrid recording. Hybrid recording is a form of thermally-assisted magnetic recording. Both hybrid recording and magneto-optical recording use a magnetic field to change locally the magnetisation of the recording layer and a radiation beam to heat the recording layer. In general, the radiation beam has a wavelength in or near the visible part of the spectrum. In hybrid recording the bits are recorded along a track of a recording layer in the form of magnetisation transitions by reversing a magnetic field at the position of the recording layer, wherein the position of the transition along the track is determined by the reversals of the magnetic field. In contrast, the position of the magnetisation reversals when using magneto-optical recording is determined by the change in power of the radiation beam used to heat the recording layer. In other words, the position of the transition is fixed by a decrease of the magnetic field in hybrid recording and by a decrease in temperature in magneto-optical recording. The sharpness of the magnetisation transition in hybrid recording is determined by the magnetic field gradient in the recording layer during the recording process, whereas in magneto-optical recording it is determined by the temperature gradient in the recording layer during the recording process. In general the thermal profile in the recording layer caused by the radiation beam is larger than the distribution of the magnetic field in the recording layer in hybrid recording and smaller in magneto-optical recording.

The increase in density is limited by the stability of the recorded bits. In order to increase the stability of the recorded information on extremely small grains, writing in hybrid recording is carried out at an elevated temperature on a medium with a very high coercivity at room temperature, using write heads with high-saturation flux guides and an integrated light path added to it. Local heating of the medium by laser light through a light path during writing reduces the coercivity of the medium temporarily to a value that makes recording with high-saturation write heads possible. With hybrid recording, a smaller transition width and higher density or a better signal-to-noise ratio can be obtained than those achievable by conventional magnetic and magneto-optical recording.

Hybrid recording media are known from inter alia the article by H. Katayama, S. Sawamura, Y. Ogimoto, J. Nakajima. K. Kojima and K. Ohta, published in Proc. of MORIS'99, J. Magn. Soc. Jpn. 23, Suppl. S1, 233 (1999). A disadvantage of these media is that the storage life of the recorded data is shorter than what is determined from the storage temperature and the stability of the magnetic transitions on the recording layer.

It is an object of the invention to provide a hybrid recording medium having a storage life of the recorded data than the known recording media.

The object of the invention is achieved if the storage medium of the preamble is characterised in that the recording layer includes a series of recording regions, each region comprising a plurality of tracks having a pitch p for magnetically recording information, and extending a distance ½ p beyond a centre line of the outermost track of the region, and in that neighbouring regions are separated by magnetically non-recording areas having a width substantially equal to or larger than the pitch p. The invention is based on the insight, that the relatively short storage life of the known storage media for thermally-assisted magnetic recording is caused by the spatial extent of the thermal profile of the known recording heads. Since the profile extends over the tracks neighbouring the one being recorded, the neighbouring tracks are subject to short periods of increased temperature. The stability of the recorded data is limited by the total heating time during and after recording. Hence, recording of a track reduces the life of the data recorded in the neighbouring tracks. Repetitive recording of parts of the medium that are very close to each other will decrease the storage life of the data. When this recording is more or less randomly organised, the maximum writing time is more or less undetermined, and no specific maximum writing time can be guaranteed. Therefore, a special data write architecture is preferred to avoid heating much longer than the unavoidable heating time due to writing the tracks once. The storage medium according to the invention solves this problem by dividing the recording layer into regions separated from one another by non-recording areas. If the regions are written in a single session, the tracks in the region have been heated only during the unavoidable heating time. The neighbouring regions have not been heated at all, because of the non-recording areas. The regions can be written in a random fashion without endangering the data recorded in neighbouring regions.

The width of the non-recording areas should be at least equal to half the width of the thermal profile in the recording layer. For a small radiation distribution the distance between the centre lines of the closest tracks of neighbouring regions should be equal to or larger than twice the pitch of the tracks within a region. For larger thermal profiles, the distance should be at least three times the pitch.

A second aspect of the invention relates to an apparatus for thermally-assisted magnetic recording of information in the form of magnetisation transitions in tracks of a recording layer of a storage medium, the apparatus including a recording head for forming a radiation field and a magnetic field at the location of the recording layer, the radiation field forming a thermal profile larger than a distribution of the magnetic field in the recording layer, a control unit for controlling the radiation field and the magnetic field such that the position along the track of the magnetisation transitions are determined by reversals of the magnetic field. The size of the thermal profile for the purpose of comparison with the distribution of the magnetic field is the area where the temperature is higher than the average of room temperature and the maximum temperature in the thermal profile. Similarly, the size of the distribution of the magnetic field is the area where the magnetic field is larger than half the value of the maximum intensity of the magnetic field in the distribution.

A hybrid recording apparatus is known from inter alia the article by H. Katayama, S. Sawamura, Y. Ogimoto, J. Nakajima. K. Kojima and K. Ohta, published in Proc. of MORIS'99, J. Magn. Soc. Jpn. 23, Suppl. S1, 233 (1999).

In the second aspect, a hybrid recording apparatus is provided that can achieve a higher areal density on storage media than the known apparatus.

This is achieved if the apparatus is characterised in that the radiation field is pulsed synchronously with the magnetic field. In the known thermally assisted recording methods, the position of the magnetisation transitions in the recording layer is determined by the decrease of the pulsed magnetic field. Since the behaviour of the radiation field is regarded as unimportant for the position and sharpness of the magnetisation transition, the radiation field is kept at a constant power and the thermal profile in the recording layer is determined by the velocity with which the recording head moves over the recording medium. The solution is based on the insight, that in a hybrid recording process the position and the sharpness of the transitions can be improved considerably by increasing the cooling of the recording layer. This is achieved by changing from a continuous radiation field to a pulsed radiation field.

The pulse time of the radiation beam is preferably shorter than $5/f_0$, where $f_0$ is the reversal attempt frequency of the recording layer. More preferably, the pulse time is shorter than $1/f_0$.

The pulse time is preferably smaller than 0.7 B/v in an apparatus for recording marks having a length B along the track, in which an actuator moves the storage medium at a velocity v with respect to the recording head.

In a preferred embodiment of the apparatus, the radiation field is elongate with a longest dimension in the track direction. The shape of the radiation field can advantageously be made using a recording head including a planar optical waveguide for forming the radiation field, the waveguide having an elongate exit window facing the location of the recording layer, the longest dimension of the exit window being oriented in the track direction.

In a preferred embodiment of the apparatus the recording head includes a magnetic read head.

The second aspect of the invention also relates to a method for thermally-assisted magnetic recording of information in the form of magnetisation transitions in tracks of a recording layer of a storage medium by imposing a radiation field and a magnetic field on the recording layer, the radiation field forming a thermal profile larger than a distribution of the magnetic field in the recording layer, and the position along the track of the magnetisation transitions being determined by reversals of the magnetic field, in which the radiation field is pulsed synchronously with the magnetic field.

A third aspect of the invention relates to an apparatus for thermally-assisted magnetic recording of information in the form of marks in tracks of a recording layer of a storage medium, the apparatus including a recording head for forming a radiation field and a magnetic field at the location of the recording layer, a magnetic read head, and an actuator for moving the recording medium relative to the recording head such that the recording head follows the tracks, the radiation field forming a thermal profile that at least partly overlaps a distribution of the magnetic field at the location of the recording layer and a trailing slope of the magnetic distribution lags behind or coincides with a trailing slope of the thermal profile. The area of the thermal profile for the purpose of determining overlap with the distribution of the magnetic field is the area where the temperature is higher than the average of room temperature and the maximum temperature in the thermal profile. Similarly, the area of the distribution of the magnetic field is the area where the magnetic field is larger than half the value of the maximum intensity of the magnetic field in the distribution. There is overlap in the above sense if both areas overlap.

A hybrid recording apparatus is known from inter alia the article by H. Katayama, S. Sawamura, Y. Ogimoto, J. Nakajima. K. Kojima and K. Ohta, published in Proc. of MORIS'99, J. Magn. Soc. Jpn. 23, Suppl. S1, 233 (1999). A disadvantage of the known apparatus is that the storage life of the storage media recorded with it are shorter than can be derived from the stability of recorded bits at room temperature.

In the third aspect a hybrid recording apparatus is provided that can record storage media having a longer storage life of the recorded data.

This is achieved if the apparatus is characterised in that the radiation distribution is elongate with a longest dimension in the track direction. The solution is based on the insight that the relatively short storage life of the information written with the known apparatus is caused by the use of a spot that is wider than the track width. This means that 'thermal' side erasure occurs, reducing the storage life of data recorded in tracks neighbouring the one currently being recorded. A roughly rectangular (pulsed) radiation spot is proposed, e.g. by using a planar wave guide of which the smallest dimension of the radiation spot is in the track width direction and the longest dimension in the direction of the track. The width of the laser spot is about equal to or smaller than the track pitch, and the medium has optimal thermal performance, so avoiding erasure by thermal decay in neighbouring tracks during writing. An extended magnetic field is generated at the trailing side of the laser (no thermal decay; no straight transition) or a magnetic field with a sharp trailing edge is generated before the trailing edge of the laser spot (small thermal decay; straight transition).

In a preferred embodiment of the apparatus, the recording head includes a planar optical waveguide for forming the radiation field, the waveguide having an elongate exit window facing the location of the recording layer, the longest dimension of the exit window being oriented in the track direction. In a specific embodiment of this recording head, the exit window includes a trailing side and a leading side, the trailing side being closer to the location of an entrance plane of the storage medium than the leading side. Preferably, the ratio of the length of the largest dimension of the exit window over the length of its shortest dimension is larger than two.

The recording head preferably includes a magnetic read head having a width about equal to or smaller than the smallest dimension of the exit window. In a special embodiment the recording head includes a magnetic write head having a width substantially equal to or smaller than the smallest dimension of the exit window.

In an advantageous embodiment the apparatus includes a control unit for controlling the radiation field and the magnetic field, adapted for pulsing the radiation field, preferably synchronously with the magnetic field.

A storage medium suitable for use in the apparatus according to the third aspect of the invention includes a substrate and a magnetic recording layer arranged on the substrate, the substrate having a large heat capacity and small resistivity to serve as a heat sink for the magnetic recording layer, the magnetic recording layer having a small heat capacity and a thermal resistivity lower in the direction of the heat sink than in the plane of the magnetic recording layer.

A fourth aspect of the invention relates to a storage medium for thermally-assisted magnetic recording including a recording layer for writing information in the form of magnetisation transitions by heating the recording layer to a temperature $T_w$ during a time $t_w$, the recording layer having an anisotropy field $H_k$, a saturation magnetisation $M_s$, a remanence $M_r$ and a reversal attempt rate $f_0$. The invention also relates to an information storage system including said storage medium and an apparatus for recording information on the medium.

Hybrid recording media are known from inter alia the article by H. Katayama, S. Sawamura, Y. Ogimoto, J. Nakajima. K. Kojima and K. Ohta, published in Proc. of MORIS'99, J. Magn. Soc. Jpn. 23, Suppl. S1, 233 (1999). In the fourth aspect hybrid recording media are provided having a higher areal density than the known recording media.

This is achieved if in the recording medium the anisotropy field and the saturation magnetisation have a temperature dependence complying with $$H_k(T_s)M_s(T_s) = C\, H_k(T_w)M_s(T_w)$$

where $T_s$ is a storage temperature of the recording medium smaller than the write temperature $T_w$ and C is a constant larger than or equal to 4. The areal density increase over conventional magnetic recording is than a factor of sqrt (C)=2 or more.

Preferably, the recording medium is characterised by a temperature dependence of the anisotropy field and the saturation magnetisation complying with $$H_k(T_s)M_s(T_s) \geq \left(\frac{T_s \ln(t_s f_0)}{T_w \ln(t_w f_0)}\right) H_k(T_w)M_s(T_w)$$

where $T_s$ is the storage temperature of the storage medium and $t_s$ is a decay time equal to 3 $10^7$s. The parameter $t_w$ is the write time, i.e. the time that the written bits are subject to heating to approximately $T_w$. The relation gives the required medium parameters to achieve a storage lifetime equal to $t_s$ by reducing thermally-activated magnetisation reversals in the recording layer. Since the first factor after the inequality sign is proportional to the gain in areal density of hybrid recording over conventional magnetic recording, the inequality also gives the areal density achievable in hybrid recording as a function of write and storage parameters and the stability parameter $f_0$. If the parameters of the medium are chosen using the > sign in the inequality, the read signal that can be obtained from the medium will be higher than when the = sign is used.

The stability of the recorded magnetisation transitions is improved if $H_k(T) M_s(T)$ is monotonically increasing when the temperature T of the recording layer decreases from $T_w$ to $T_s$.

For a thermally-assisted recording system with a read temperature $T_r \geq T_s$ for reading recorded information, the storage medium has parameters $H_k(T_r)$ and $M_s(T_r)$ that comply preferably with $$\frac{H_k(T_r)}{H_k(T_w)} \geq \frac{M_s(T_r)}{M_s(T_w)} \geq \left(\frac{T_r \ln(t_r f_0)}{T_w \ln(t_w f_0)}\right)^{\frac{1}{2}}$$

where $t_r$ is the time the recording layer stays on temperature $T_r$ during reading. For safety this time may be chosen equal to $t_s$. Note that $t_r = t_s$ when $T_r = T_s$. In a specific embodiment, the read temperature $T_r$ is larger than $T_s$, wherein $M_s \neq 0$ at $T_s$. The storage medium has preferably monotonically increasing values of $H_k(T)$ and $M_s(T)$ for a temperature T decreasing from $T_w$ to roughly $T_r$, and $H_k(T)$ monotonically increasing and $M_s(T)$ monotonically decreasing for the temperature T decreasing from roughly $T_r$ to $T_s$.

In a preferred embodiment the storage medium complies with $$\frac{H_k(T)}{M_s(T)} \geq 1 \text{ or } \frac{H_C(T)}{M_r(T)} \geq 0.5$$

at every temperature between $T_w$ and $T_s$ and $M_r$ is the remanence of the recording layer.

The storage medium advantageously complies with $$1.4 \leq \frac{H_k(T)}{M_s(T)} \leq 2 \text{ or } 0.7 \leq \frac{H_C(T)}{M_r(T)} \leq 1$$

at every temperature between $T_w$ and $T_s$.

The storage medium suitable for reading at a temperature $T_r$ substantially equal to $T_s$, is preferably characterised in that $H_k(T)$ and $M_s(T)$ are monotonically increasing for a temperature T decreasing from $T_w$ to $T_s$.

Preferably, $H_c(T_w) > 240$ kA/m and/or $H_c(T_s) > 480$ kA/m.

The storage temperature $T_s$ is preferably substantially equal to 300 K.

The write temperature $T_w$ complies preferably with $T_s + 100$ K$< T_w < 800$ K. More preferably, $T_s + 100$ K$< T_w < 570$ K.

The storage medium has preferably a value of the write time $t_w$ that complies with 10 ns$< t_w < 10$ µs.

The reversal attempt rate $f_0$ of the recording layer is preferably substantially equal to $10^9$/s.

An information storage system including a storage medium having a recording layer with an anisotropy field $H_k$, a saturation magnetisation $M_s$ and a reversal attempt rate $f_0$, and an apparatus for thermally-assisted magnetic recording of information in the form of magnetisation transitions in the recording layer by heating the recording layer, the apparatus including a recording head for forming a radiation field and a magnetic field at the position of the recording layer to be recorded and a control unit for controlling the radiation field and the magnetic field, in which the control unit is adapted for controlling the radiation beam such that the recording layer is heated to a temperature $T_w$ during a time $t_w$, and that a temperature dependence of the anisotropy field $H_k$ and the saturation magnetisation $M_s$ complies with $$H_k(T_s)M_s(T_s) \geq \left(\frac{T_s \ln(t_s f_o)}{T_w \ln(t_w f_o)}\right) H_k(T_w)M_s(T_w)$$

where $T_s$ is the storage temperature of the storage medium and $t_s$ is a decay time equal to $3 \cdot 10^7$s.

The advantages of the invention will now be more fully explained with reference to the drawings, in which FIG. 1 shows the areal density and medium SNR of hybrid recording with respect to conventional magnetic recording, assuming only transition noise or only random particle (Poisson) noise. Everywhere in this document, the SNR is defined as a signal ratio and not as a power ratio.

MEDIUM PARAMETERS

Figure 1:
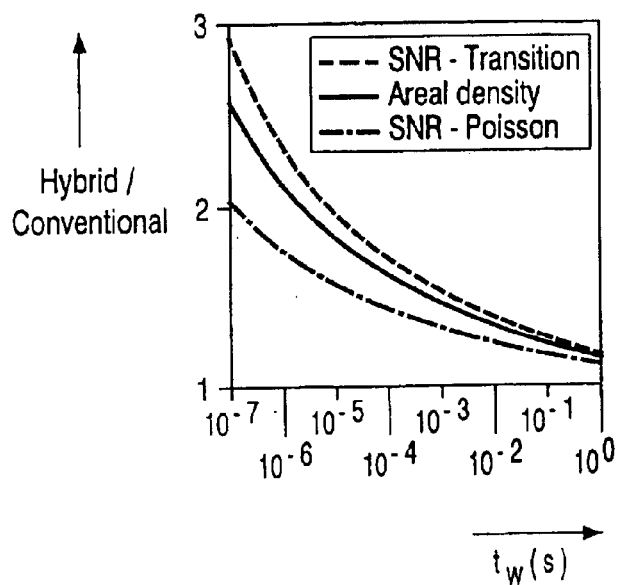

This section deals with the density or SNR improvement possible with hybrid recording and then focuses on the question which media characteristics are required to practically realise these considerable improvements. Thereafter, it focuses on the question how large improvements over conventional magnetic recording can be obtained and which (extra) media characteristics are required to practically realise these large improvements.

For the stability of written data, a high coercivity at room temperature and a large grain size is sufficient. A high coercivity field $H_c$ is also necessary for a small transition length. For the writability a writing coercivity below approximately 360 kA/m (4500 Oe) at the writing temperature, $T_w$, is necessary for writing with heads made of materials with a high saturation induction, $B_s$, like $Fe_{88}Ta_{12}N$, $Fe_{97}Si_3N$ ($B_s$=1.45 and 1.9 T) or other Fe-rich alloys. A coercivity of approximately 240 kA/m (3000 Oe) provides more freedom in the choice of write head materials (common compositions: $Ni_{80}Fe_{20}$, $Co_8Nb_9Zr_3$, $Fe_{84.9}Al_{5.6}Si_{9.5}$ have $B_s$~1 T, and higher $B_s$ when Fe or Co content is increased, e.g. $Ni_{45}Fe_{55}$ has $B_s$~1.6 T) or makes a smaller write gap possible, with the advantage of a slightly larger head-field gradient. These coercivities correspond typically to an anisotropy field, $H_k$, in case of randomly-oriented grains in a granular (poly-crystalline) medium, of roughly twice the $H_c$ value[i], viz. between 480 and 720 kA/m (6000 and 9000 Oe). For the SNR modelling further on, the conservative choice $H_k$=480 kA/m is applied.

Values of the saturation magnetisation $M_s$ or remanence $M_r$ not higher than about 1.2 H, (0.6 $H_k$, where $H_k$ is the anisotropy field) of the medium are usually to be preferred in order to avoid demagnetisation and reduction of the decay time in saturated recording at the highest linear densities and to avoid transition widening. The short-wavelength output reduction due to transition widening counteracts the larger output that an increased $M_r$ would otherwise give. For relatively thin media with respect to the bit length, higher values of $M_r$ are optimal. Hybrid recording introduces a new condition, viz. that the $M_s/H_c \approx M_r/H_c \propto H_{dem}/H_c$ ratio anywhere between the writing temperature and room temperature must be sufficiently low. A large ratio will deteriorate the transitions, because a relatively large demagnetising field reduces the energy barriers for magnetisation jumps in the demagnetising field direction. Direct demagnetisation or rapid thermally-activated reversals according to the Arrhenius-Néel law then take place. This has negative effects on both the short-wavelength output and the medium's transition noise. At room temperature it has dramatic effects on the storage lifetime of the remaining information according to the same Arrhenius-Néel law.

The temperature dependence of $M_r/H_c$ of commercially-available media do not fulfil the basic requirement of sufficiently low $M_r/H_c$ ratio at (and below) the writing temperature, only at room temperature the ratio is optimal.

There is a maximum-possible advantage of hybrid recording over conventional magnetic recording, assuming that media with any combination of $H_k(T)$ and $M_s(T)$} could be developed. The magnitude of the advantage follows from recording considerations like those above and Arrhenius-Néel decay:

$$\frac{H_k(T_s)}{H_k(T_w)} \approx \frac{M_s(T_s)}{M_s(T_w)} \geq \left(\frac{SNR_{med,H}}{SNR_{med,C}}\right)^\beta = \qquad (0.1)$$

$$\left(\frac{D_{a,H}}{D_{a,C}}\right)^{3/4} = \left(\frac{V_C}{V_H}\right)^{1/2} = \left(\frac{T_s \ln(t_s f_o / \ln(2M_r/(M+M_r)))}{T_w \ln(t_w f_o / \ln(2M_r/(M+M_r)))}\right)^{1/2}$$

where $\beta$=1 for random-particle (Poisson) noise and $2/3$ for transition noise, $t_w$ and $t_s$ are the decay times in seconds from magnetisation $M_r$ at t=0 to M at t=$t_w$ or $t_s$, and $f_0$ is the reversal attempt rate. The decay times $t_w$ and $t_s$ must be chosen equal to the maximum total heating time at temperature $T_w$ experienced by an arbitrary point of the medium and required storage time at temperature $T_s$ of the medium, respectively. The subscripts H and C denote hybrid and conventional recording, respectively.

The last ratio in (0.1) determines the possible improvements in SNR and $D_a$ (3-rd and 4-th ratio) and minimum hybrid-recording-medium requirements (1-st and 2-nd ratio). From studying the last ratio and realising that $t_s$ is almost 15 orders larger than $t_w$, it follows that the maximum density or SNR improvement is mainly determined by $t_s$ and $t_w$ and to a lesser extent by $T_s/T_w$. Realistic changes in $f_0$ and $M/M_r$ are of minor importance. The 5-th ratio, between the minimum grain volume in conventional recording, $V_C$, and the minimum grain volume in hybrid recording, $V_H$, is added for getting some feeling of the physics behind the expression. Because of the logarithmic functions in the last expression, this volume ratio is very small compared to the decay-time ratio $t_s/t_w$. The grain volume reduction in hybrid recording can be used for a medium's SNR improvement or for an areal density increase.

The $M_s$ and $H_k$ ratio's according to the = signs in (0.1) indicate minimum conditions for an optimal medium for hybrid recording: this 'minimal' hybrid recording medium must have a constant $H_k(T)/M_s(T)$ ratio during cooling down. Hence, a preferred medium for hybrid recording is a medium with an anisotropy field $H_k$ and a saturation magnetisation $M_s$ at the storage (e.g. ambient) temperature, $T_s$, which roughly equal the improvement factor times the $H_k$ and $M_s$ at the recording temperature, $T_w$ (e.g. 200° C). Between the write and the storage (more specifically the read) temperature, $H_k(T)/M_s(T) \gg H_k(T_w)/M_s(T_w)$ is a good choice. It is also preferred to choose $H_k(T)$ and $M_s(T)$ to increase gradually (monotonically) between the write and the storage (more specific the read) temperature and to choose $H_k(T) \times M_s(T)$ to increase gradually (monotonically) between the write and the storage temperature.

A higher $M_s$ at the storage temperature than claimed for the above 'optimal' medium by using the > sign in expression (0.1), combined with a roughly proportionally higher $H_k$ at the storage temperature, does not offer a higher density or lower medium noise. It does offer more output, which reduces the influence of noise sources other than medium noise. So, in cases where the head output is insufficient to 'suppress' these noise signals, e.g. electronics noise, to levels far below the medium noise, it is favourable to use a higher $M_s$ at storage (more specifically the read) temperature than claimed for the above 'optimal' medium, combined with a roughly proportionally higher $H_k$ at storage (more specific the read) temperature.

When reading is carried out at a temperature $T_r$ higher than $T_s$, then $M_s(T_s)$ is allowed to be much smaller or even zero as long as $K(T_s) \sim M_s(T_s)$ $H_k(T_s) \sim M_s(T_s)$ $H_c(T_s)$ is sufficiently increased with respect to $K(T_w)$ in order to guarantee long-term storage. This might lead to the choice of an MO type medium with compensation temperature at approximately $T_s$, and sufficient $M_s(T_r)$ for magnetic read out.

In case of reading at a temperature $T_r$ higher than $T_s$ and application of an MO type medium with compensation temperature near $T_s$, it remains preferred to choose $H_k(T)/M_s(T) > $ or $\approx H_k(T_w)/M_s(T_w)$ between the write (and read temperature and between the read) and storage temperature. This guarantees that the transition does not deteriorate during cooling down. At every temperature between write and storage temperature, $K(T) \sim H_k(T) \times M_s(T)$ must be sufficient. This means that at the storage temperature, K must be large, since the storage time is large (it helps that the demagnetising field is close to zero at $T_s$). Also at the readout temperature, K must be rather large, because many read cycles must be allowed. Between the read and storage temperature, K must remain large enough to withstand thermal decay over longer periods. This means that the strong reduction of $M_s$ upon cooling from read to storage temperature must be accompanied by a strong increase of $H_k$.

The temperature dependence of $M_r/H_c$ of known media do not fulfil the basic requirement of sufficiently low $M_r/H_c$ ratio at (and below) the writing temperature, only at room temperature the ratio is optimal.

Realising that the actual choice of the value of M is of minor importance in the result of expression (0.1), the expression can be rewritten as follows $$H_k(T_s)M_s(T_s) \geq \left(\frac{T_s \ln(t_s f_o)}{T_w \ln(t_w f_o)}\right) H_k(T_w)M_s(T_w)$$

The advantage of hybrid over conventional magnetic recording is calculated by way of example using the following parameter values: $M/M_r=0.8$, $f_0=10^9$ s$^{-1}$, $T_w=450$ K, $T_s=300$ K and $t_s=10$ yr, and the results are shown in FIG. 1 as a function of $t_w$. The write time $t_w$ is the dwell time of the moving thermal profile in the recording layer formed by a radiation field of constant intensity moving over the recording layer at the write speed.

A practical value for the total time that an arbitrary point of the medium is heated is $t_w=490$ ns. This value corresponds to a realistic spot centre-line heating time of 100 ns (longitudinal spot diameter 1 $\mu$m and velocity 10 m/s) and heating-up six tracks at a time (transversal spot diameter of 1 $\mu$m and a track pitch p of 0.16 $\mu$m). The 0.16 $\mu$m track pitch corresponds to an areal density $D_a=100$ Gb/in$^2$ for p/B=4.27 (using W/g=4, g/B=0.8 and W/p=0.75, with W=trackwidth, g=gap length and B=user bit length, viz. the shortest distance between transitions, assuming a simple non-return-to-zero, NRZI, code). An increase of the areal density with a factor 2.2, or an increase of the medium SNR for Poisson noise of 5.3 dB (1.8×) and 8 dB (2.5×) for transition noise, is for this $t_w=490$ ns theoretically possible.

Repetitive recording of parts of the medium that are very close to each other will increase the maximum heating time further. When this recording is more or less randomly organised, the maximum writing time is more or less undetermined, and no specific maximum writing time can be guaranteed. Therefore, a special data write architecture is preferred to avoid heating longer than the aforementioned unavoidable heating time (490 ns in the above example). This is worked out in the next section.

Expression (0.1) subsequently indicates that a preferred single-layer medium for hybrid recording to make the above improvements possible, for the above choices and conditions, should have a reduction of $H_k$ ($\propto H_c$) of a factor of 1.8 between storage temperature $T_s$ and writing temperature $T_w$, accompanied with an equally-strong reduction of $M_s$, ($\approx M_r$).

A preferred embodiment of the storage medium complies with $$\frac{H_k(T)}{M_s(T)} \geq 1 \text{ or } \frac{H_c(T)}{M_r(T)} \geq 0.5$$

at every temperature between $T_w$ and $T_s$. Likewise, $$1.4 \leq \frac{H_k(T)}{M_s(T)} \leq 2 \text{ or } 0.7 \leq \frac{H_C(T)}{M_r(T)} \leq 1$$

at every temperature between $T_w$ and $T_s$. When the recording layer does not increase in temperature during reading but remains at the storage temperature, $H_k(T)$ and $M_s(T)$ are preferably monotonically increasing when the temperature T decreases from $T_w$ to $T_s$. When the read temperature $T_r$ is higher than $T_s$, $M_s$ is preferably about equal to 0 at $T_s$.

$H_k(T)$ and $M_s(T)$ are preferably monotonically increasing when the temperature T decreases from $T_w$ to roughly $T_r$, and $H_k(T)$ monotonically increasing and $M_s(T)$ monotonically decreasing when the temperature T decreases from roughly $T_r$ to $T_s$. Preferably $H_c(T_s)$>480 kA/m and $H_c(T_w)$>240 kA/m; more preferably $H_c(T_w)$>240 kA/m.

Preferably, the storage temperature $T_s$ is substantially equal to room temperature, i.e. 300 K. The write temperature $T_w$ preferably complies with $T_s+100$ K<$T_w$<800 K. The write time $t_w$ preferably complies with 10 ns<$t_w$<10 μs.

Write Architecture

A special data write architecture is preferred to avoid heating longer than the aforementioned unavoidable heating time (490 ns in the example mentioned above). The main characteristic of the architecture is mutually separated recording areas, i.e. a magnetically non-recording area surrounds the recording regions of the recording layer where magnetic recording is permitted. A non-recording area is an area where magnetic recording is inhibited. Such an area does not comprise any information recorded by hybrid recording. The recording of a region will not impair the storage life of data recorded in a neighbouring recording region. The width of the non-recording areas is preferably at least equal to about halve the width of the thermal profile, the width of the thermal profile being substantially equal to the width of the radiation distribution on the recording layer. Every recording region is (re)written as a whole, thereby avoiding that individual tracks within a region are randomly subjected to heating caused by recording on a neighbouring track.

The non-recording areas separating zones may contain information, e.g. regarding the zone number, and the non-recording areas dividing 'sectors' (spokes) contain e.g. information regarding the sector number and/or track number within that zone or sector. Preferably the type of information in these non-recording areas is not magnetic, because of the stability problem, unless the magnetic material in these non-recording areas has considerably higher coercivity or much larger particles than in the recording areas. A good choice is any (low-information-density) structure that can be detected optically with the aid of the optical system that is already available in the thermally-assisted recording system.

Figure 2:
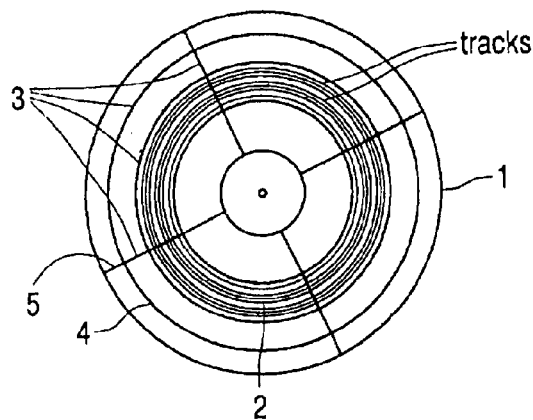
FIG. 2 shows a disc-shaped recording medium and the nomenclature concerning disk architecture (drawing is not to scale).
Figure 3:
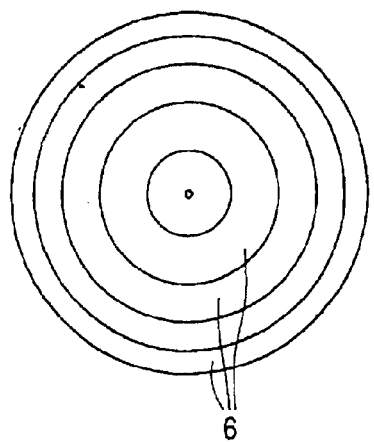
FIG. 3 shows a disc-shaped recording medium with the definition of zones.

FIG. 2 shows a schematic drawing of a disc-shaped storage medium 1 according to the invention, in which the recording layer is divided in recording regions 2, each recording region in the embodiment shown forming a part of an annular zone on the medium. Such a recording region is also called a sector. The information is recorded in one or more tracks in each recording region. A track is a section of the path to be followed by the recording head. Tracks may be circular or spiral, as in the storage medium shown in FIG. 2, or straight as in a rectangular storage medium such as a card. The tracks are substantially parallel in view of the cross-talk problem of this invention. The tracks are provided with a conventional servo structure, not shown in the figure, for guiding the recording head, e.g. a groove or a pattern of embossed pits. Each recording region 2 comprises a plurality of tracks. The recording regions are separated from one another by non-recording areas 3. The non-recording areas in the embodiment shown in FIG. 2 are annular trenches 4, which separate sectors radially, and radial trenches 5, which separate sectors in the longitudinal or track direction. The radial trenches between sectors at different radii are aligned to form a spoke pattern, as shown in the Figure. FIG. 3 shows a series of zones 6 on the storage medium.

The servo structure of the tracks may be continued in the non-recording areas. The location of the non-recording areas and/or the recording regions may be indicated by entries in a table recorded in a control area of the recording layer. An example of such a table is given in FIG. 4. Each entry in the table contains addresses marking the beginning and end of an area by means of track numbers and/or sector numbers. The position of the areas may also have been defined in a standard, and an apparatus for scanning the storage medium includes a memory in which the position information is stored. During recording, the apparatus writes information in the tracks, until it encounters an address marked in the table as the beginning of a non-recording area. The apparatus will interrupt the recording process until it reaches the address marked in the table as the end of the non-recording area, from where it continues the recording of information.

Figures 4, 5:
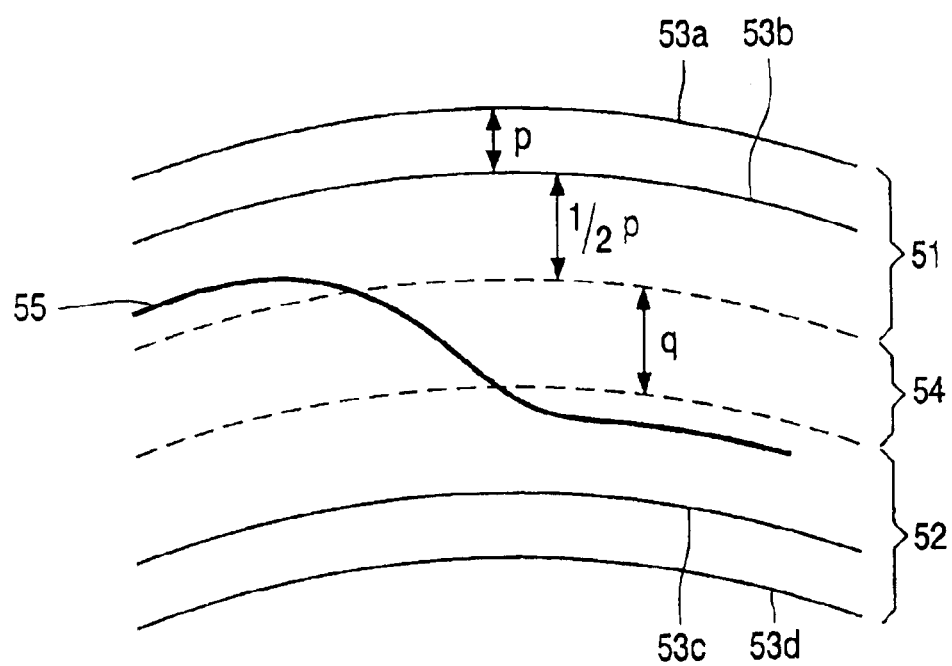
FIG. 4 shows a table recorded on the storage medium and having entries pointing to non-recording areas on the storage medium.
FIG. 5 shows tracks around a non-recording area of a storage medium.

In another embodiment of the storage medium the non-recording areas are not provided with a servo structure, avoiding a recording head to scan the areas in normal read or write operation. FIG. 5 shows part of a recording region 51 and a neighbouring recording region 52. Tracks 53a–d in the recording regions have a track pitch p, being the transverse distance between the centre lines of neighbouring tracks. A recording region extends a distance ½ p from the centre line of the outermost track 53b of the region. The width q of the non-recording area 54 between the regions 51 and 52 has a width of at least p, making the distance between the centre-lines of the outermost tracks of the regions equal to at least 2 p. To reduce the cross-erase between recording regions further, the width q is preferably equal to or larger than 3 p. The major part of the area 54 is not provided with a servo structure, apart from a track 55 that connects the two neighbouring recording regions.

Considerations Related to Optimal Architecture

An embodiment of a storage medium according to the invention has the following parameter values:

| | |
|---|---|
| track pitch, p, | 0.16 μm |
| track width, W, | 0.12 μm |
| bit length, B, | 0.037 μm | thereby attaining an areal density of 100 Gb/in$^2$. These above values are used in the following numerical examples, unless otherwise stated.

In the 100 Gb/in$^2$ example, the hybrid recording medium is so designed, that the necessary 6 times heating of neighbouring tracks is acceptable. This means in practice that a recording region enclosed by a non-recording area has to be rewritten as a whole. Keeping track of the number of exposures of a particular track when random writing is permitted within a region might be a solution, but appears to be relatively complex. Therefore, the whole region has to be re-written, even if only part of the tracks has to be replaced. Moreover, the rewrite takes time again. If the regions are not only separated along the tangential direction (i.e. circles or ellipses) but also along the radial one (radii or 'spokes'), only part of the revolution of the storage medium with respect to the recording head can be spent reading or writing and a considerable latency time might arise between successive times the spot arrives in the same area. This might degrade the effective data rate by a factor 10 or more with respect to the read and write rate. An effective size of the regions can be found for two different applications:

the PC (personal computer) like application where relatively small units of information are stored (like word files etc.) mostly smaller than one MB (mega byte), AV (audio-video) applications for storing sound and video information. In this case the size of the units may be much larger, in general>10 MB.

To investigate this, it is useful to define the number of bits in one (circular or spiral-shaped) track of a 360° angular extent. The recordable area of a disk has a extends typically between radii 24 and 57 mm. So the outer tracks will have twice the amount of data of the inner tracks. The number of tracks (not counting the non-recording areas) is roughly 210000 (track pitch=0.16 µm). The capacity of the innermost track will be about 0.5 MB and the outermost track 1.2 MB. That means that one track has already a capacity that is high for PC-usage, and combining two or more of them will readily yield a capacity of the "sector" much larger than a unit found in present day PC-usage.

Therefore, a region in a storage medium for PC applications should not have too many tracks. From this emerges the picture of zones that include a limited number ($N_p$) of tracks between two radii. To lower the capacity of a region further, without causing very inefficient use of the area on disk, a zone can be divided into $N_z$ sectors, each of an angular extent $360°/N_z$ along the tangential direction. This is similar to the structure found on current optical and magnetic disk devices. For example the so-called "blue DVR format" has 155 zones and 8 spokes divide the tracks. For larger units to be stored the spokes are ignored and the entire 360° of a full track are read or written. This corresponds to the AV application. To lower the amount of buffer memory needed for this read/write scheme and to minimise the loss in case a sector is found defective we try to limit the capacity of a zone. The number of zones and spokes should be a balance between the efficient use of the disk area, the capacity of the sector for PC use and the capacity of the zone for AV applications.

A typical example might be: Take 2000 zones and 64 spokes. A zone is roughly 17 µm wide (~106 tracks). At the inner radius (24 mm), this corresponds to a capacity of roughly 53 MB. By taking 64 spokes this would yield 0.84 MB per sector. At the outer radius (57 mm) the capacity of a zone would be 129 MB. The capacity of a sector would be 2 MB. By increasing the number of spokes proportional to the radius (e.g. from 64 to 155) this number could be lowered to the value at the inner radius. Because of the recording areas, about 3–4% of the disk area is lost for data storage.

The storage capacity per zone is relatively large in this example. The playing time of the (inner) zone of 53 MB (424 Mb total, or around 212 M user bits) video at a typical user bit rate of 10 Mb/s is already 21 seconds. The factor two is taken for overhead of channel code and ECC (Error Correction Code). For AV storage 21 seconds seems is large. This can be chosen to be below 10 seconds (also for the outer radius). The capacity per zone should be lowered to around 10 to 20 MB. This corresponds to ~5000 zones and 32 spokes. However, the storage efficiency will drop because nearly 5000/2000=2.5 times more non-recording areas will be on the disc, resulting in almost 10% loss of disc area.

The division of the storage medium into recording regions has consequences for the data rate when recording, for the embodiment having a division in 2000 zones (AV application: 106 tracks of 360°) and for the embodiment in which the zones are divided by 64 spokes (PC application: 106 tracks of 5.6°). For the application this means that either a whole zone is rewritten in AV storage or a 64 times smaller sector in PC storage. If it is assumed that v=10 m/s, the maximum bit rate equals 10 [m/s]/0.037 $10^{-6}$ [m/bit]=270 [Mb/s]. This corresponds, at the 24 mm inner radius, to a rotational frequency of 68 Hz and revolution time of ~15 ms. If all data in a complete zone should be replaced, the effective data rate will be 270 Mb/s as well. If only one of the sectors has to be rewritten, the effective data rate will decrease by a factor equal to the number of spokes, yielding, for the above example, 270 [Mb/s]/64=4.2 Mb/s-effective. A total time of 1.6 s will be needed to replace all the 106 tracks (0.84 MB). For the outer tracks the effective data rate for replacing one sector is smaller and will be around 1.7 Mb/s. In case of 5000 zones and 32 spokes the effective data rate will go up by roughly a factor 2.

Normally the nature of defects on a storage medium of the type covered by the invention requires a certain amount of recording space to be reserved for the correction unit (ECC block). In optical recording the length of such a block is often chosen equal to one complete track of 360° at the inner radius and, because the number of bits in such a block must be constant, almost 180° at the outer radius. This large length of the ECC block causes information to be spread out over large parts of the disk and the chance on fatal burst errors is minimised. This error correction strategy does not map properly (is in conflict) with the 'PC strategy' in which only one sector is replaced. Reading and buffering complete zones (with a data rate of 270 Mb/s, totally as well as effective) for the PC application too, is preferable for error correction. This hardly increases the time necessary for total replacement of a sector, because the latency time is reduced partly or completely. An increased buffer size, like for the AV mode, is now necessary.

There are two well-known speed modes for scanning a disc-shaped storage medium:
constant linear velocity (CLV), generally applied for audio-video, e.g. in optical disk drives,
constant angular velocity (CAV), generally applied for data, e.g. in hard disk drives.

The spinning-up in CLV-mode, when going to inner radii, costs time and energy. From these points of view, the CAV mode is preferable. The heating time, however, increases almost inversely proportional to the linear speed and is in CAV mode hence inversely proportional to the radius, i.e. approximately 2-times larger at inner radii than at outer radii. This increases the number of bit-reversals due to thermal agitation during heating time by about the same factor of 2 at inner radii. This is not a serious problem, given the required low raw bit-error-rates. The difference between raw error rates of, for example 1 $10^{-6}$ and 2 $10^{-6}$ is of minor importance for the error rate after error correction and in view of all kind of tolerances. If such an increase in error rate were not tolerable, only an exceptionally small increase of the volume of the particles, or activation volumes in case of a continuous medium, would suffice to restore the required stability and, hence, the required raw bit-error-rate. This is because the required particle (or activation) volume is proportional to the logarithm of the ratio reversal-time and the very-small reversal attempt period $1/f_0$.

Further Development of Hybrid Recording

It can be shown that an increase in areal density by more than a factor 2.9 or 7 dB (2.2×) $SNR_{med}$ improvement for Poisson noise and 11 dB (3.4×) for transition noise (obtained when $T_w$ would be close to $T_s$ and $M_r$ and $H_c$ are reduced by a factor of at least 2.9 between $T_s$ and $T_w$) is theoretically impossible for the above described hybrid recording systems. At areal densities below 100 Gb/in² the maximum improvement is slightly larger and at higher densities slightly lower. A spot size of the radiation distribution of 0.3 µm instead of 1 µm would result in an increase of $SNR_{med}$ for Poisson noise from 5.3 dB to 6.7 dB.

An unexpectedly large improvements over conventional magnetic recording (and 'conventional' hybrid recording) is possible for special hybrid recording systems with values of $f_o \times t_{w\ equiv}$ substantially smaller than assumed above. These values can be achieved by pulsing the radiation field.

A very good comparison between the conventional magnetic recording and the special hybrid recording can be obtained numerically when the Arrhenius-Neel decay is valid. If the write temperature $T_w$ were taken close to the storage temperature $T_s$ (practically unrealistic and dangerous), the absolutely largest improvement would be obtained. In all calculations, however, a saver write temperature $T_w=1.5\ T_s$ is taken.

Figure 6:
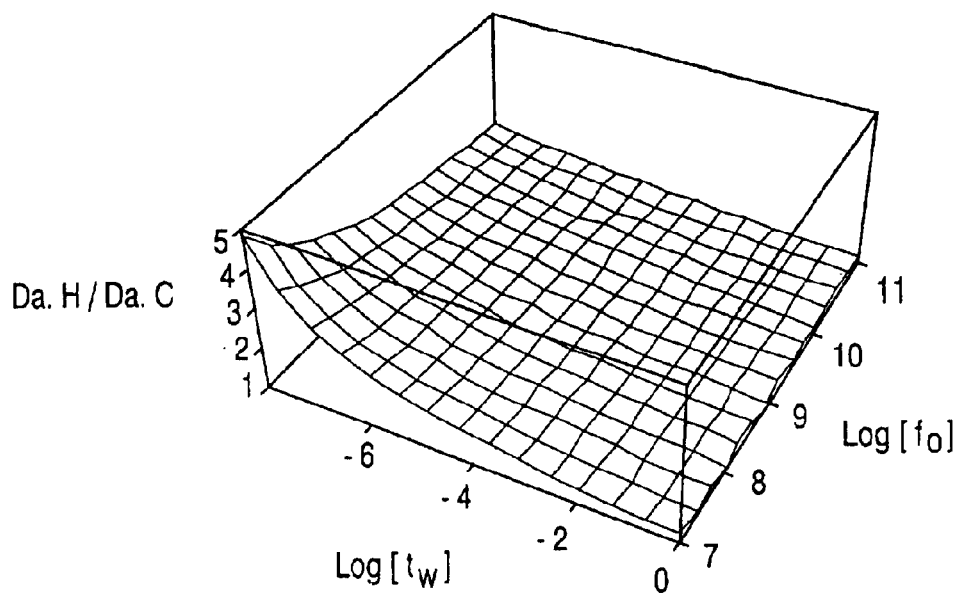
FIG. 6 shows a graphical presentation of the areal density $D_a$ ratio versus total heating time $t_w$ and reversal attempt rate $f_0$.
Figure 7:
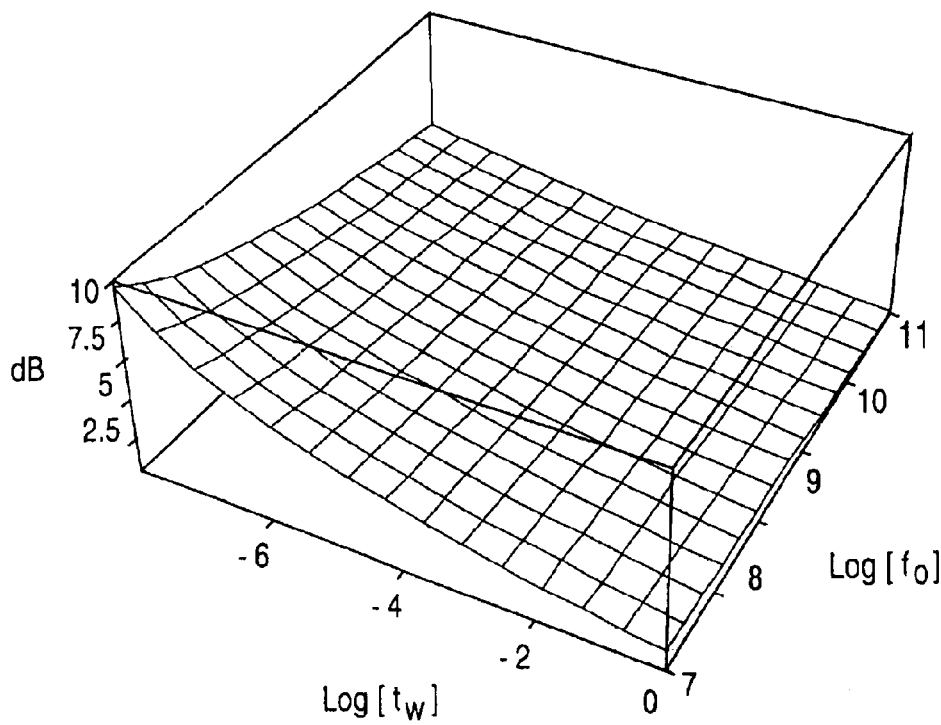
FIG. 7 shows a graphical presentation of the signal-to-noise ratio versus total heating time $t_w$ and reversal attempt rate $f_0$.

The following parameter values have been used in the calculations for FIGS. 6 and 7 relating to hybrid recording using relatively large values of $f_o \times t_{w\ equiv}$.

(*Input, for continuous heat spot*)
$T_s=300$ K; (*Storage temperature*)
$T_w=450$ K; (*Effective spot temperature*)
$t_s=10*365*24*60*60$ s; (*Required storage time*)
Dspot=1 $10^{-6}$ m; (*Effective transversal hot-spot diameter*)
v=10 m/s; (*Medium velocity*)
p=0.16 $10^{-6}$ m; (*Pitch; 0.16 μm is 100 Gb/in² situation*)
Novw=0; (*Number of overwrites before refreshing; 0=no overwrite, i.e. every time refresh*)
$f_s=10^9$ s$^{-1}$; (*Reversal attempt rate, i.e. reversal attempt time is 1 ns*)
M=240 $10^3$; (*Required remanent magnetisation at t=$t_s$ and t=$t_w$*)
$M_r$=300 $10^3$; (*Maximum remanent magnetisation, at t=0*)
$t_{ww}$=Dspot/v; (*Spot centre-line heating time*)
$t_w$=(Novw+1)*(Pi/4)*Dspot/p*$t_{ww}$; (*Total heating time. Note: proportional to Dspot2. For the embodiment of a hybrid recording system with minimal thermal side erasure, the total equivalent heating time, $t_{w\ equiv}$ is substituted per definition for $t_w$ in (0.1), and varied.*)
(*Additional input for pulsed heat spot*)
$t_{pp}$=50*$10^{-9}$ s; (*Effective single-shot heating time for pulsed instead of continuous heating. Choose at least about equal to minimum reversal time. Larger than 0.7 times the bit time B/v is not useful. Typical heating time is 50 ns laser pulse+ca. 20 ns 'dwell time'.*)
Wog=4; (*Read track width over gap length W/g*)
beta1=0.8; (*g/B; B=bit length*)
beta2=0.75; (*W/p; p=pitch*)

The results of the calculation for the comparison of the hybrid recording with $t_w >> 1/f_o$ and conventional magnetic recording are shown in FIGS. 6 and 7. In FIG. 6 the vertical axis gives the ratio of areal density for hybrid and conventional magnetic recording, and the horizontal axes the logarithm of the heating time $t_w$ and the logarithm of the reversal attempt rate $f_0$. In FIG. 7 the vertical axis gives the ratio of the SNR of the medium for hybrid and conventional magnetic recording in dBs and the horizontal axis give the same parameters as FIG. 6.

Hybrid recording with extremely short heating pulses requires that the heating time $t_w$ of the recording layer is of the order of $1/f_0$ or shorter, resulting in $t_{w\ equiv} \to 1/f_o$. The areal density or SNR will increase further with respect to that of 'conventional' hybrid recording, if the heating pulses are extremely short, the storage medium has a very thin recording layer, a very good heat sink is arranged below the recording layer, and the recording layer has a correspondingly large value for the $M_s(T_w)/M_s(T_s)$ ratio, according to expression (0.1). The $M_s(T_w)/M_s(T_s)$ ratio is called $M_s$Ratio below.

When the value of the pulse time $t_{pp}$ is chosen in the calculations to be very low, the number of heating pulses experienced by each grain in the medium for pulsed heating is calculated and the resulting total heating time (worst case assumption) is taken into account. For long heat pulses (e.g. due to slow heating and cooling), when the time between bits is smaller than the heat-pulse time, the normal situation of continuous heating is in fact reached and then automatically, as such, taken into account.

It should be noted that the analyses are based on the Arrhenius-Neel expression and, hence, the underlying assumption behind all the approximations is thermal equilibrium during the major part of the total heating time. This is not correct for a total heating time that consists of a number of well-separated heat pulses of durations of the order of the reversal attempt time $1/f_0$ or smaller. The decay in the approximation is then overestimated ('worst case'): it takes some 'switching' time, $t_s$, before a first reversal can take place. You can still use the Arrhenius-Neel expression if you introduce an equivalent total heating time, $t_{w\ equiv}$, that is smaller than the actual heating time, $t_w$. This follows from the following description of the physics just after writing and just after the beginning of a heating period when a magnetisation state away from thermal equilibrium moves quickly to thermal equilibrium.

The Arrhenius-Neel expression underlying the quantitative results does not accurately describe the thermally-activated reversal process shortly after writing (and also shortly after the beginning of a heat pulse when no recording field is applied). Shortly after writing (or heating) means: within a time of the order of the 'reversal attempt time' $1/f_0$, or 'switching' time $t_s$. This switching time equals roughly $t_s \approx 1/(\alpha\gamma H_{equiv})$, with α=Gilbert's damping constant, γ=the gyromagnetic ratio and $H_{equiv}$=total equivalent field experienced by the local spontaneous magnetisation (see e.g. p. 369–370 in the book by J. J. M. Ruigrok, Short-wavelength magnetic recording, Elsevier 1990). Directly after recording with a field well above the (dynamic) coercivity, the magnetisation is roughly 'lined-up' with the recording field applied just before. Hence, directly after recording the magnetisations of the grains or activation volumes are not in thermal equilibrium with the lattice. (Also in the absence of a recording field, there is no thermal equilibrium directly after every beginning of a new heat pulse, because at the previous lower temperature the magnetisations lined-up better with the average anisotropy field etc., due to smaller thermal agitation and larger $H_k$ and $M_s$.) Because of the 'slowness' of the magnetisation process (described by the switching time) to line-up with the total forces included in $H_{equiv}$ (demagnetising fields and anisotropy 'field' etc. including thermal fluctuations) it spends a few switching times, $t_s$, before the magnetisations of the grains or activation volumes are in equilibrium with the thermally-activated lattice. After a few times $t_s$, when thermal equilibrium between magnetisation and lattice is established, you can rely on the reversal rate predicted by the Arrhenius-Neel expression (assumed an accurate expression for $f_0(H_{equiv}(T))$ would be available and applied). At shorter pulses the decay is overestimated. This can be compensated in the Arrhenius-Neel expression etc. by introducing an equivalent total heating time, $t_{w\ equiv}$, that is smaller than the actual heating time, $t_w$.

Nevertheless, the above improvement factors already described qualitatively correct the very short heating times within the order of the reversal time $1/f_0$ and prevent the medium from switching by thermal agitation during the time that the medium is locally heated and the static coercitive field $H_{c0}$ is strongly reduced. Consequently it will also be difficult to switch the magnetisation during a comparably short recording time. A higher recording field, in order to reduce the switching time, is then necessary. This means in fact a higher dynamic coercivity.

The calculations for the very short heating times, using a final areal density $D_a$=100 Gb/in², $D_{spot}$=1 μm and v=10 m/s, yield:

For continuous heating (i.e., $t_w$=490 ns), $M_s$Ratio=1.83 and $D_a$Ratio=2.24.
For 1 ns pulses, $M_s$Ratio=1.99 and $D_a$Ratio=2.51.
For 100 ps pulses, $M_s$Ratio=2.42 and $D_a$Ratio=3.25.
For 10 ps pulses, $M_s$Ratio=3.35 and $D_a$Ratio=5.02.
For 1 ps pulses, $M_s$Ratio=11.4 and $D_a$Ratio=25.7.

For shorter pulses the maximum possible density improvement factor, $D_a$Ratio, and the necessary magnetisation in the medium at storage temperature, $M_s$Ratio, become very large.

The large $D_a$Ratios are of course much higher than necessary for an areal density of 100 Gb/in². At higher final areal densities they become valuable. It is noted, however, that due to the larger number of tracks within the spot diameter at higher densities, $t_w$ is larger than assumed above ($t_w \propto \sqrt{D_a}$ for continuous heating and $\propto D_a$ for short pulses). Only when heating is applied very locally (at the location of the write field, e.g. by applying laser light throughout the gap of the write head) without overlap with neighbouring tracks (and without overlap with many neighbouring bits), very large density improvements become possible for very short heat pulses. In all other cases, the extra effect of short pulses are moderate.

Figure 8:
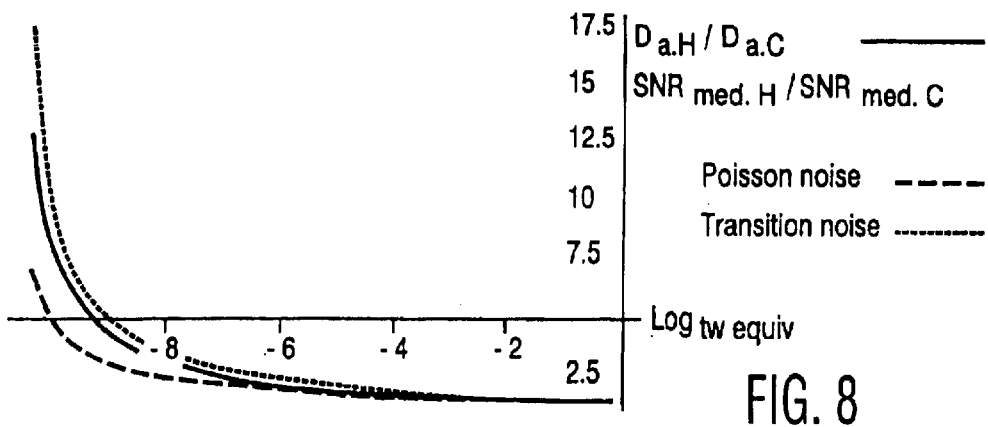
FIG. 8 shows a graphical presentation of the signal-to-noise ratio and the areal density ratio versus heating time $t_{w\,equiv}$.

In the graph shown FIG. 8 the improvement factors $D_a$Ratio and $SNR_{med}$Ratio are plotted as a function of the total equivalent heating time, $t_{w\ equiv}$, of each grain in the medium. The total equivalent heating time is considerably shorter than the actual heating time for very short heat pulses. $D_a$ is the areal density (drawn line in the Figure) and SNR the signal-to-noise ratio [P=Poisson noise (dashed line in the Figure), T=transition noise (dotted line in the Figure), H=hybrid recording and C=conventional magnetic recording]. The value of $t_{w\ equiv}$ ($=1/f_0$) is equal to 1 ns and is represented by −9 on the x-axis. Other input values for the calculations have been given above.

As described, the equivalent heating time becomes (much) smaller than the actual sum of the heat-pulse times when the heat-pulse time $t_{pp}$ is of the order of or below the reversal-attempt time $1/f_0$, and equals the actual total heating time for pulses longer than a few times the reversal-attempt time.

Figure 9:
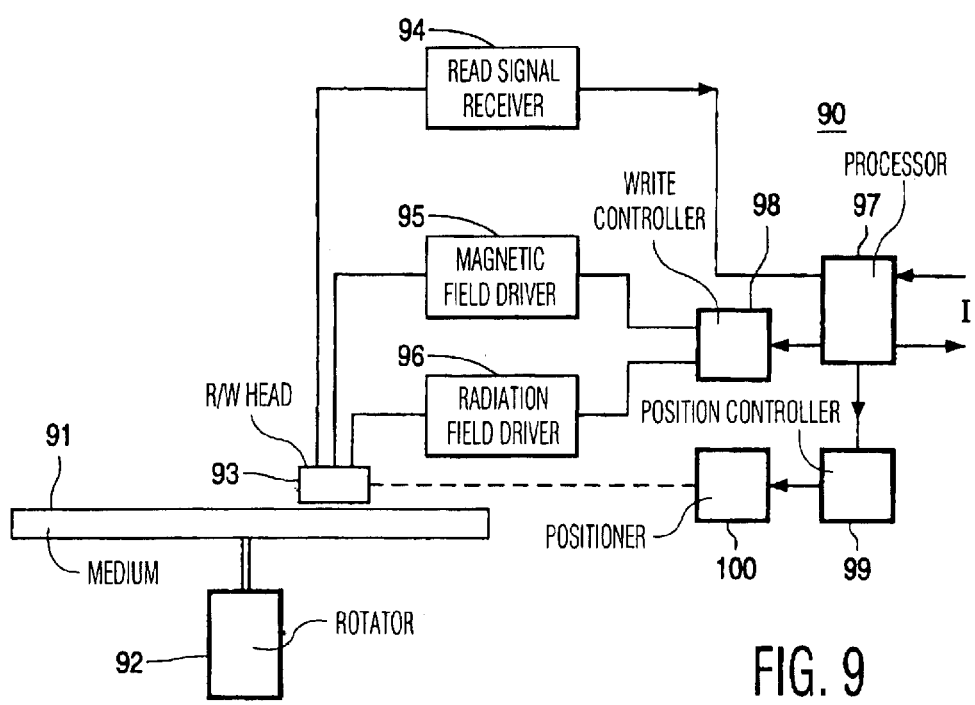
FIG. 9 shows an apparatus for thermally-assisted recording.

FIG. 9 shows an apparatus 90 for thermally-assisted recording according to the invention. A disc-shaped storage medium 91 is rotated by an actuator 92. A recording head 93 includes a (not shown) read and write head and an optical head. A receiver 94 is connected to the read head and detects the data in the read signal from the read head. A driver 95 controls the magnetic field of the write head and a driver 96 controls the radiation field of the optical head. A processing unit 97 makes the data read from the storage medium available for further use and accepts data to be written onto the storage medium. The processing unit provides a control unit 98 with information for writing data. The control unit controls the two drivers 95 and 96 such that the magnetic field and the radiation field are pulsed in the correct way to record the data. A control unit 99, provided with information about the actual position of the recording head 93 from the processing unit 97, controls the radial position of the recording head with respect to the recording medium 91 via an actuator 100.

Figure 10:
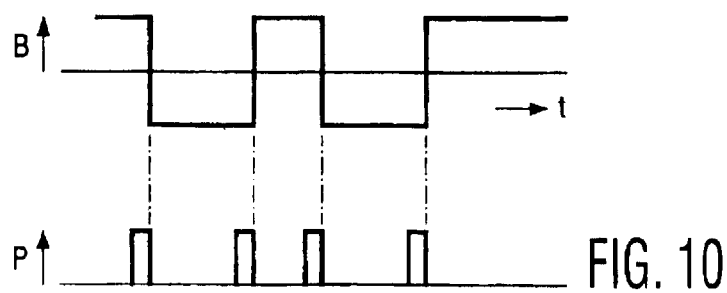
FIG. 10 shows a timing diagram of the magnetic field reversals and the radiation field pulses.

FIG. 10 shows a diagram with the magnetic field B as a function of time t in the top trace and the power P of the radiation field in the bottom trace. The radiation pulses are synchronised to the magnetic field reversals, such that the trailing edges of the radiation field substantially coincide with the reversals.

To reap the full benefits of the short radiation pulses, a hybrid-recording layer stack preferably consists of:

a magnetic recording layer having
1) a small heat capacity, such that it heats up quickly and with low laser power
2) optimal thermal resistivity, such that it cools down quickly into the heat sink, but not so fast that laser power is wasted
3) anisotropic thermal resistivity: larger in the lateral direction(s) than in the direction of the heat sink
4) additionally to a magnetic recording layer with a small resistivity in the direction of the heat sink, an intermediate layer with an optimal resistivity may be applied; this combination is to be preferred for the more uniform temperature in the recording layer it gives rise to an under-layer or substrate with large heat capacity and small enough resistivity (e.g. a metal), serving as a heat sink, such that the magnetic top layer cools down quickly without heating the surrounding.

A columnar structure or patterned structure helps considerably in obtaining the desired anisotropic thermal resistivity in the recording (and intermediate) layer.

Figure 11:
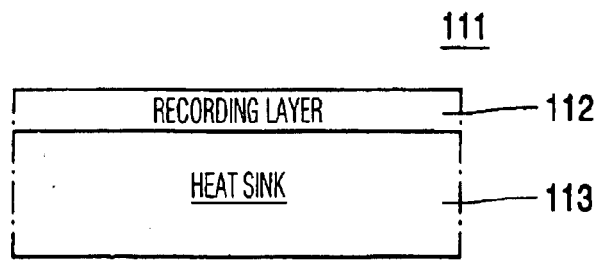
FIG. 11 shows a simple hybrid-recording stack of a hybrid storage medium.

FIG. 11 shows a simple hybrid recording stack 111 of a storage medium. A recording layer 112 is arranged on a heat sink 113. The recording layer is a 12 nm layer of $Tb_{22}Co_{18}$ with a Curie temperature of about 600 K, determined by the type of transition metal, and a compensation temperature of about room temperature. Changing Co to Fe, lowers the Curie temperature to 400 K. The recording layer may also be made of $Tb_{21.5}Fe_{71}Co_{7.5}$, yielding a similar compensation temperature. The latter has a heat capacity C of 2.8 $10^6$ J/(m³K) and a thermal conductivity L=9 W/(m.K). For reading close to room temperature, it is necessary to reduce the rare-earth content in the above composition ($\Delta T_{comp}$=30 K/at %-RE content change). The heat sink is a layer of e.g. 25 nm thick AlCr, having L=20 W/(m.K) and has a heat capacity C=2.7 $10^6$ J/(m³K). An Al substrate or layer may also serve as heat sink; Al has a very high thermal conductivity of L=190 W/(m.K), which makes it a better heat sink.

Figure 12:
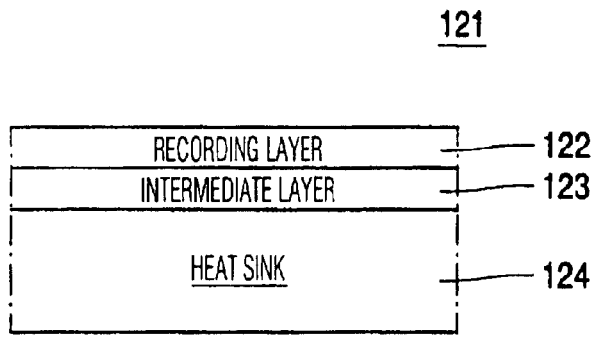
FIG. 12 shows a hybrid-recording stack with intermediate layer for better temperature uniformity.

FIG. 12 shows a hybrid recording stack 121 including a recording layer 122, an intermediate layer 123 and a heat sink 124. The recording layer has a low heat capacity and is similar to the recording layer 112. The intermediate layer has an optimal thermal conductivity. The intermediate layer may be an oxide, e.g. Al-oxide, having a thermal conductivity L=1 W/(m.K) and a thickness of e.g. 6 nm. The heat sink preferably has a high heat capacity and a high thermal conductivity both with respect to those of the recording layer and is similar to the heat sink 113.

Hybrid-Recording System with Minimal Thermal Side Erasure a) When the laser spot does not extends beyond the magnetic spot (both in the track-width direction and in the direction of the track at the trailing side), the recording becomes comparable with MO-type recording. In that case a low coercivity is allowed: the magnetisation is frozen-in by the steep spatial temperature decrease. For the reading by an MR sensor, applied instead of using the Kerr effect (in conventional MO recording/playback) because of the densities in which we are interested (bit size<optical spot size), a larger medium remanence, $M_r$, (and hence a larger Hc) than for normal MO systems is desired.

Figure 13:
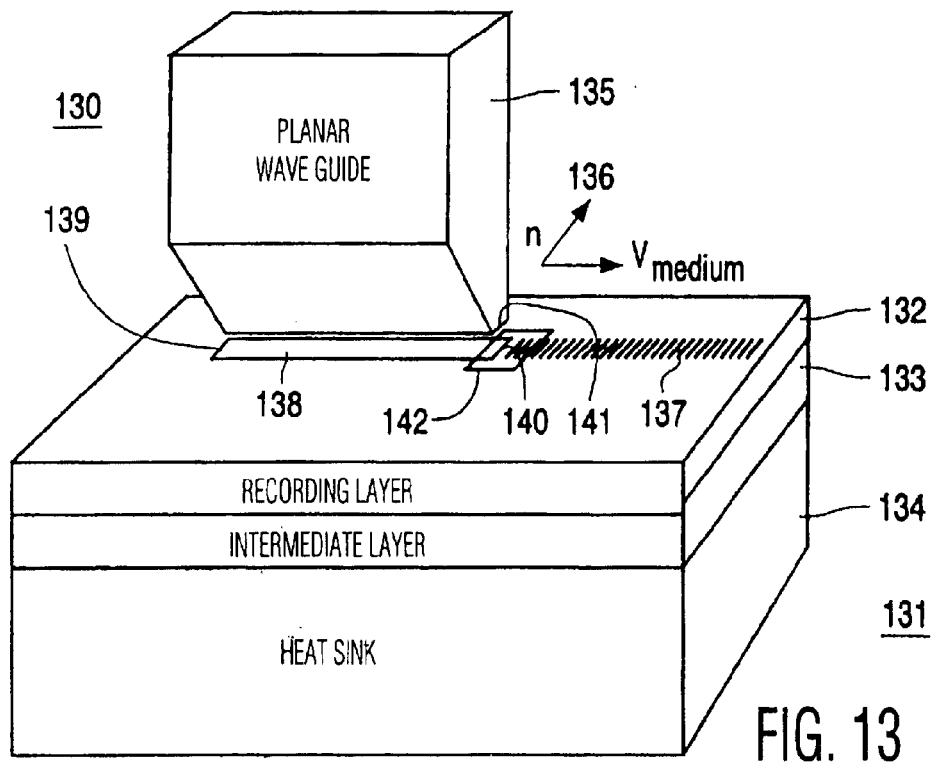
FIG. 13 shows hybrid-recording head with a low-Hc($T_w$) type of medium.

FIG. 13 shows an embodiment of the recording head 130 for such a system in which account has been taken of the knowledge concerning thermal decay developed above and in the following section 'Additional information . . . '. The head is operatess on a storage medium 131 provided with a recording layer 132 having a low heat capacity, an intermediate layer 133 having an optimal thermal conductivity, and a substrate 134, acting as a heat sink. In the case of perpendicular recording, the recording layer and/or the intermediate layer may include a soft-magnetic back layer. To avoid side erasure/decay by the thermal spot for track widths $W<\lambda_{light}$, a tapered planar wave guide 135 or laser is utilised with its smallest dimension in the width direction n (arrow 136) of the track 137. The wave guide has an exit window facing the recording layer, the longest dimension of the window being oriented in the tract direction. The ratio of the longest dimension and the shortest dimension is eight. Especially when low-coercivity (at $T_w$) media would be applied (e.g. MO-type media), this is important. But also in combination with a 'hybrid recording medium' with a high coercivity at $T_w$, the proposed set-up is attractive. The wave guide 135 forms an elongate heat spot 138 in the recording layer. The spot has a leading side 139 facing the part of the track over which the wave guide has not yet passed, and a trailing side 140 opposite to the leading side. A thin-film write head 141 (or write pole in case of perpendicular recording) is located near the trailing side 140 of the spot 138 and has a width about equal to or smaller than the shortest dimension of the exit window. The location of the write field is indicated by the rectangle 142 at the trailing side of the spot. As indicated, the write-field 'spot' is allowed to be much longer and wider than the bit length and track width, respectively, and the slope of the field at the edges of the magnetic field spot are totally unimportant. A read head can be located on the write head, but this is not necessary.

b) Alternatively, a write head with a steep field profile at its trailing edge (preferably, but not necessarily, a small-pole length (or small-gap length) write head) can be placed some distance away from the trailing edge of the thermal spot (to the left, i.e. in the direction of the leading edge of the thermal spot). Because of thermal decay in the hot spot between the trailing edge of the magnetic spot and the trailing edge of the thermal spot, a hybrid-recording medium with parameters $M_r$ and $H_c$ according to expression (0.1) with $t_w$ small, but unequal to zero, should be applied.

This disadvantage of the necessity of a higher $H_c(T_w)$ and $M_r(T_w)$ (with respect to embodiment a) due to some thermal decay is paid back by surely straighter and possibly sharper transitions than in embodiment a. The straighter transitions are advantageous for read out with a magnetic read head.

A larger $M_s(T_s)$, and hence a larger $H_k(T_s)$, than necessary for thermal stability (i.e.>sign instead of=sign in (0.1)) delivers more magnetic read signal. The general requirement for thermal stability, in case the $M_r(T)/H_c(T)$ or $M_s(T)/H_k(T)$ ratio is not fixed (relevant for reading at $T_r>T_s$), is more complicated than expressed by (0.1).

An over-width of the above magnetic write heads has hardly negative effects.

The improvement factors obtainable are very large now, see FIG. 8, since $t_w$ is very small (embodiment b) or zero (embodiment a). Moreover, the track width is not determined by optical limits but by the sub-micron width of the magnetic head, and the bits have a rectangular shape.

The alternative b comes close to the set-up of the previous proposals 1, 2 and 3 for thermally-assisted recording with a relatively large laser spot, extending beyond the magnetic spot (in the track-width direction as well as in the direction of the track at the trailing side), for which a recording layer with a high coercivity (or K) is needed and the magnetisation is frozen-in by the steep spatial decrease of the magnetic field from the magnetic head or pole.

Medium parameters like the anisotropy energy, K, the anisotropy field, $H_k$, the coercive field, $H_c$, the saturation magnetisation, $M_s$, and the remanent magnetisation, $M_r$, are important parameters in this invention. In the case of a recording layer consisting of a multi-layer stack of (magnetically coupled) layers with different parameter values, always the effective parameter values of the stack are used.

In the (in)equalities, $H_c$ can be substituted for $H_k$, $M_r$ can be substituted for $M_s$ and K or $H_cM_r$ can be substituted for $H_kM_s$ (because they are proportional to each other, i.e. $H_c \propto H_k$, $M_r \propto M_s$ and consequently $K=\frac{1}{2}\mu_0 H_k M_s \propto H_k M_s \propto H_c M_r$). This does not apply to (in)equalities in which absolute values play a role instead of ratio's between the same parameters.

In addition, the $\geq$ and $\leq$ signs have to be interpreted as larger or approximately as large as and smaller or approximately as small as, respectively.

Additional Information Regarding (Inapplicability of) Known Media

Figure 14:
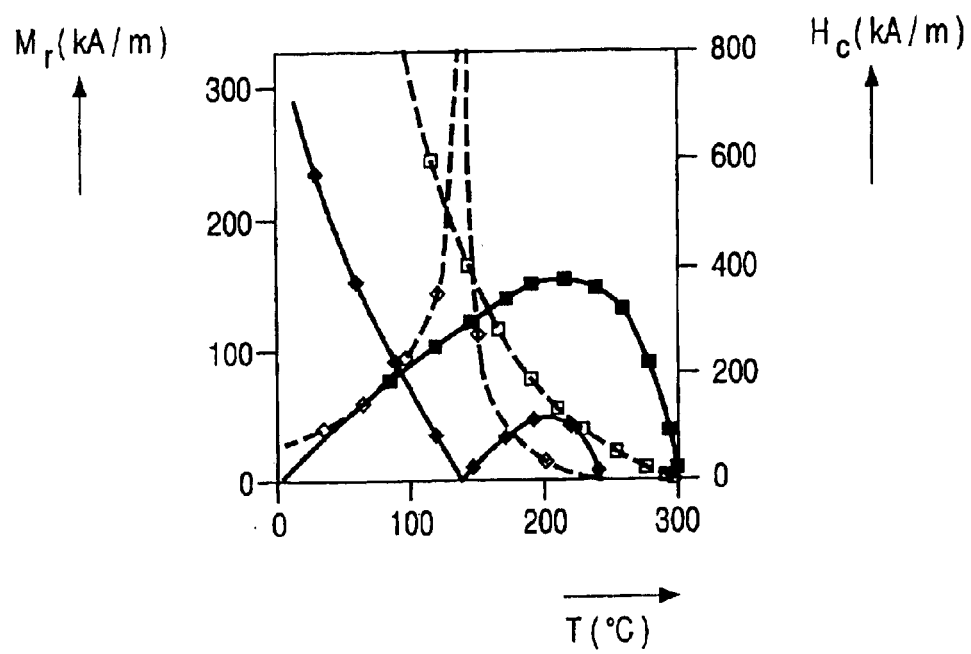
FIG. 14 shows the temperature dependence of $M_r$ (solid lines) and $H_c$ (dotted lines) of a double-layer MO-type medium for thermally-assisted recording[vi]. Squares (■;□): memory layer; diamonds (♦;◊): read out layer.

Quite different type of media that can be made applicable for hybrid recording are MO-type media. Perpendicular MO media have been developed for writing at high temperatures. The (read-out) layers of these media have been optimised for magneto-optical (Kerr-effect) read-out. Magnetic read out requires optimisation of the $M_s$ at the read-out temperature. FIG. 14 shows the magnetic properties of a double-layer MO-type medium, adopted by Nemoto et al.[vi] of Hitachi to thermally-assisted writing and read out at room temperature.

The magnetisation of almost 300 kA/m (300 emu/cm³) of the read-out layer at room temperature is convenient for magnetic read out. The relatively very-low coercivity of the Tb—Dy—Fe—Co read-out layer itself at room temperature is compensated by exchange coupling to the Tb—Fe—Co memory layer having very high coercivity at room temperature.

Figure 15:
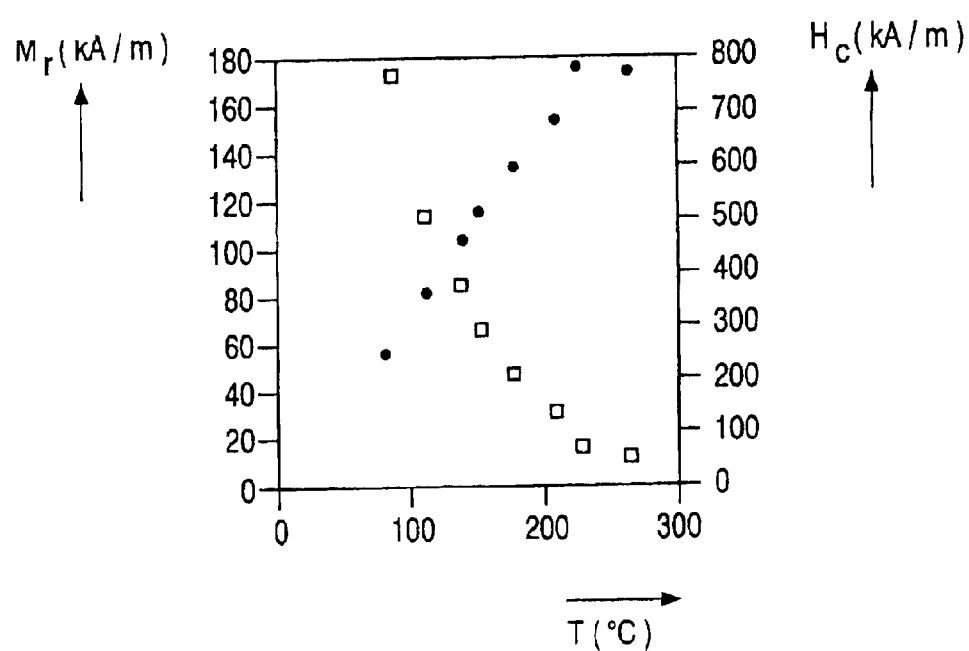
FIG. 15 shows the temperature dependence of $M_r$ (●) and $H_c$ (□) of single-layer MO-type medium for thermally-assisted recording.

A single-layer magneto-optical (MO) type of medium was optimised by Katayama et al.[ii] for thermally-assisted writing and reading. The compensation temperature of the rare-earth transition-metal (RE-TM) alloy chosen, $Tb_{23}Fe_{22}Co_{55}$, is around room temperature, see FIG. 15.

The absence of demagnetising fields due to the compensation of the $M_s$ of the RE sublattice by that of the TM sublattice at room temperature guarantees large storage times.

In order to assess the suitability of MO-type media for hybrid recording at ultra-high densities, thermal-decay considerations like those for single-layer conventional hard-disk type media should be applied, with modifications on (at least) two points. Firstly, MO layers are not granular (polycrystalline) but continuous (amorphous) and an effective activation volume will take over the role of the exchange-decoupled grains in granular media. Secondly, MO media are perpendicular, and as a result the demagnetising field decreases when the bit length decreases. We do not know of much experimental and theoretical work on the activation volume of MO media and of its possible dependence on the recording density and its meaning for transition and Poisson noise. For the Sharp medium (and also approximately for the memory layer of the Hitachi medium), assuming an activation volume definition equivalent for thermal stability to the definition of the (activation) volume of decoupled grains, a minimum activation volume of $(13 nm)^3$ must be required for sufficient thermal stability during 490 ns total reading (or writing) time at 177° C. (450 K). For this result we further assumed $M_r$=130 kA/m, $H_c$=200 kA/m, $M_s$=$M_r$, $H_k$=$2H_c$ and the maximum demagnetising field $H_{dem}$=$M_r/4$ (the minimum activation volume would be $(12 nm)^3$ for $H_{dem}$=0). A bit volume $WBt_m$=122×38×9.5 $nm^3$=$(35 nm)^3$, with $t_m$ the medium thickness, corresponding to 100 Gb/in² for the parameters used earlier in this section, would occupy only 20 of these activation volumes. An insufficient medium SNR of 17 dB (7×) would result, supposing that these activation volumes are approximately equivalent to grain volumes for transition noise and Poisson noise is absent. For Poisson noise the medium SNR is only 13 dB (4.5×).

It must be realized that in all normal MO media, i.e. having very-low $H_c$'s of the order of 16 kA/m (200 Oe), written data would decay immediately at the enhanced writing temperature in the laser spot just after writing in a thermally-assisted recording scheme with a relatively large laser spot. This is true in particular, when the activation volumes of the MO medium would be reduced for obtaining a reasonable S/N ratio at very-high densities.

Model calculations on a commercially-available granular hard disk medium from Komag with its too large $M_r/H_c=$ (280 kA/m)/(150 kA/m) ratio at the desired writing temperature of 450 K yielded a larger demagnetising field, $H_{dem}=M_r/2$, than assumed for the MO media. Consequently a worse medium SNR (14 dB, assuming only transition noise) resulted. These calculations suggest that for hybrid recording (much) higher $H_c$ and $M_s$ values than in the known media as well as proper $M_r(T)/Hc(T)$ ratio's are required for continuous MO-type as well as for granular media.

List of Literature References

[1] H. Neal Bertram, Hong Zhou and Roy Gustavson, IEEE Trans. Magn. 34, 1845 (1998).
[ii] H. Katayama, S. Sawamura, Y. Ogimoto, J. Nakajima. K. Kojima and K. Ohta, Proc. of MORIS'99, J. Magn. Soc. Jpn. 23, Suppl. S1, 233 (1999).
[iii] H. Nemoto, H. Saga, H. Sukeda and M. Takahashi, Proc. of MORIS'99, J. Magn. Soc. Jpn. 23, Suppl. S1, 229 (1999).
[iv] H. Saga, H. Nemoto, H. Sukeda and M. Takahashi, Proc. of MORIS'99, J. Magn. Soc. Jpn. 23, Suppl. S1, 225 (1999).
[v] S. H. Charap, Pu-Ling Lu, Yanjun He, IEEE Trans. Magn. 33, 978 (1997).
[vi] H. Nemoto, H. Saga, H. Sukeda and M. Takahashi, Jpn. J. Appl. Phys. Vol. 38, 1841 (1999).

What is claimed is:

1. A storage medium for thermally-assisted magnetic recording including a recording layer having substantially parallel tracks for recording information, characterized in that the recording layer includes a series of recording regions, each region comprising a plurality of tracks having a pitch p for magnetically recording information, each recording region extending a distance ½ p beyond a center line of an outermost track of the recording region, and in that neighboring recording regions are separated by identifiable magnetically non-recording areas having a width substantially equal to or larger than the pitch p.

2. The storage medium according to claim 1, wherein the medium includes a table having entries pointing to the non-recording areas.

3. The storage medium according to claim 1, wherein the tracks in the recording regions are provided with a servo structure for tracking and at least part of the non-recording areas lacks a servo structure.

4. The storage medium according to claim 1, wherein the medium has a disk-shape, and the recording regions are annular zones separated by annular non-recording areas.

5. The storage medium according to claim 4, wherein at least one of the annular zones is divided into sectors by radially extending non-recording areas.

6. The storage medium according to claim 5, wherein at least two zones are divided into sectors and the radially extending non-recording areas of the zones are aligned.

7. The storage medium according claim 1, wherein the width of the non-recording areas is substantially equal to or larger than three times the pitch p of the tracks.

8. The storage medium according to claim 1, wherein the non-recording areas contain optically detectable marks representing information.

9. The storage medium according to claim 5, wherein the annular non-recording areas include zone-address information.

10. The storage medium according to claim 5, wherein the radially extending non-recording areas include track-address information.

11. A method for recording information on a storage medium including a recording layer having substantially parallel tracks for recording information, characterized in that the information is recorded in recording regions that are separated by at least one non-recording area, each recording region comprising a plurality of tracks having a pitch p for magnetically recording information, the recording region extending a distance ½ p beyond a center line of an outermost track of the recording region, and the non-recording area having a width substantially equal to or larger than a pitch of the tracks.

12. The method according to claim 11, wherein the information is recorded in recording regions that are separated by at least one unrecorded transverse area extending perpendicular to the tracks, the transverse area having a width in a direction parallel to the tracks substantially equal to or larger than a pitch of the tracks.

13. The method according to claim 11, wherein a recording region is recorded in one write session.

14. An apparatus for thermally-assisted recording of information on a storage medium including a recording layer having substantially parallel tracks for recording information, a recording head, and an actuator for moving the recording head relative to the storage medium, characterized by a control unit for controlling the actuator such that information is recorded in mutually separated recording regions, each recording region comprising a plurality of tracks having a pitch p for magnetically recording information, each recording region extending a distance ½ p beyond a center line of an outermost track of the recording region, and in that neighboring recording regions are separated by magnetically non-recording areas having a width substantially equal to or larger than the pitch p.

* * * * *